(12) United States Patent
Lee et al.

(10) Patent No.: US 12,347,578 B2
(45) Date of Patent: Jul. 1, 2025

(54) DEVICE FOR ASSEMBLING AND DISASSEMBLING TOP NOZZLE OF NUCLEAR FUEL ASSEMBLY

(71) Applicant: KEPCO NUCLEAR FUEL CO., LTD., Daejeon (KR)

(72) Inventors: Je Won Lee, Daejeon (KR); Min Kyu Lee, Daejeon (KR); Sung Jun Park, Seoul (KR)

(73) Assignee: KEPCO NUCLEAR FUEL CO., LTD., Daejeon (KR)

( * ) Notice: Subject to any disclaimer, the term of this patent is extended or adjusted under 35 U.S.C. 154(b) by 0 days.

(21) Appl. No.: 18/716,631

(22) PCT Filed: Feb. 28, 2022

(86) PCT No.: PCT/KR2022/002840
§ 371 (c)(1),
(2) Date: Jun. 5, 2024

(87) PCT Pub. No.: WO2023/128055
PCT Pub. Date: Jul. 6, 2023

(65) Prior Publication Data
US 2025/0029739 A1    Jan. 23, 2025

(30) Foreign Application Priority Data

Dec. 28, 2021    (KR) .......... 10-2021-0189164

(51) Int. Cl.
*G21C 3/334*    (2006.01)
*G21C 3/33*    (2006.01)

(52) U.S. Cl.
CPC ........... *G21C 3/334* (2013.01); *G21C 3/3315* (2013.01)

(58) Field of Classification Search
CPC . Y10T 29/49004; Y10T 29/531; G21C 3/334; G21C 3/3315; G21C 19/105; G21C 19/36; G21F 9/28
(Continued)

(56) References Cited

U.S. PATENT DOCUMENTS 4,086,132 A * 4/1978 Meuschke ............ G21C 19/105
376/245
4,235,066 A * 11/1980 King ...................... G21C 21/08
976/DIG. 286

(Continued)

FOREIGN PATENT DOCUMENTS

JP    2010-145280 A    7/2010
KR    10-1994-0004831 B1    6/1994
(Continued)

*Primary Examiner* — Sarang Afzali
*Assistant Examiner* — Darrell C Ford
(74) *Attorney, Agent, or Firm* — You & IP, LLC

(57) ABSTRACT

Proposed is a device for assembling and disassembling a top nozzle of a nuclear fuel assembly wherein the top nozzle of the nuclear fuel assembly is assembled and disassembled with improved convenience, and the load value is measured to ensure stable operations without damaging components. To this end, the device includes a pedestal including a threaded hole through both sides, a screw bar screw-coupled to the threaded hole to reciprocate in a straight line, a top nozzle plate configured to be detachably coupled to the screw bar and to be able to be hooked by and coupled to the top nozzle of the nuclear fuel assembly, and a load cell provided between the top nozzle plate and the screw bar to measure a load value applied to the top nozzle plate hooked on the top nozzle.

5 Claims, 5 Drawing Sheets

(58) Field of Classification Search
USPC .......................................... 29/593, 723, 906
See application file for complete search history.

(56) References Cited

U.S. PATENT DOCUMENTS

| | | | | |
|---|---|---|---|---|
| 4,558,504 | A * | 12/1985 | Le Pargneux | G21C 3/334 |
| | | | | 29/DIG. 48 |
| 4,620,960 | A * | 11/1986 | Wilson | G21C 3/334 |
| | | | | 376/451 |
| 4,646,414 | A * | 3/1987 | Wilson | G21C 3/334 |
| | | | | 29/723 |
| 4,667,547 | A | 5/1987 | Shallenberger et al. | |
| 5,317,609 | A * | 5/1994 | Fichet | G21C 3/334 |
| | | | | 376/261 |
| 5,646,973 | A * | 7/1997 | Proebstle | G21C 3/3315 |
| | | | | 376/435 |
| 5,699,393 | A * | 12/1997 | Picard | G21C 3/334 |
| | | | | 376/261 |
| 11,373,770 | B2 | 6/2022 | Son et al. | |
| 2011/0317797 | A1 | 12/2011 | Tomatsu et al. | |
| 2021/0088431 | A1* | 3/2021 | Son | G21C 17/06 |

FOREIGN PATENT DOCUMENTS

| | | |
|---|---|---|
| KR | 10-1162002 B1 | 7/2012 |
| KR | 10-2013-0077598 A | 7/2013 |
| KR | 10-2018-0062700 A | 6/2018 |
| KR | 10-2019-0091716 A | 8/2019 |

\* cited by examiner

DEVICE FOR ASSEMBLING AND DISASSEMBLING TOP NOZZLE OF NUCLEAR FUEL ASSEMBLY

TECHNICAL FIELD

The present disclosure relates to a device for assembling and disassembling a top nozzle of a nuclear fuel assembly and, more specifically, to a device for assembling and disassembling a top nozzle of a nuclear fuel assembly, wherein the device allows the top nozzle to be disassembled and assembled easily and stably into a skeleton of the nuclear fuel assembly.

BACKGROUND ART

A nuclear reactor is an apparatus that artificially controls chain nuclear fission reactions of nuclear fissile materials, thereby using heat energy generated from nuclear fission as power. Nuclear fuel used in the nuclear reactor is manufactured by molding enriched uranium in a form of a cylindrical pellet of a certain size and loading a plurality of the pellets into each fuel rod. Such a plurality of the fuel rods constitutes a nuclear fuel assembly and is loaded into a core of the nuclear reactor, whereby burning is accomplished through a nuclear reaction.

Such nuclear fuel assemblies are provided in two types: KSNP-type and WH-type. With reference to FIG. 1, the WH-type nuclear fuel assembly includes: a skeleton that includes a top nozzle 30, a bottom nozzle 40, spacer grids 10, and guide tubes 20; and fuel rods F that are inserted into and supported by the support grid 10, wherein the fuel rods F are supported by dimples and springs provided in the support grids 10. The nuclear fuel assembly constructed in this way is loaded into the reactor core to cause a nuclear reaction to occur, and the heat generated in the nuclear fuel rods by nuclear fission is exchanged as the coolant flowing into the reactor passes through the lower core plate and flows upward along the nuclear fuel rods.

Meanwhile, assembling the nuclear fuel assembly described above is accomplished by coupling the top nozzle 30 to an insert and securing the lock tube. Thereafter, in order to insert the fuel rods F into the skeleton, the top nozzle 30 is separated from the skeleton, the fuel rods F are inserted into the skeleton, and the top nozzle 30 is reassembled to complete assembling the nuclear fuel assembly. On the other hand, when the top nozzle 30 is separated from or assembled to the skeleton, a maximum load of 270 kgf is applied. Such a load value is required to be measured when an operation for separating or assembling the top nozzle 30 is performed to prevent parts from being damaged. Therefore, in a series of operations for assembling/separating the top nozzle 30, a device that may measure the load along with the operations is required. In particular, WH-type nuclear fuels 16ACE7 and 17ACE7 each have top nozzles 30 of different sizes (height, width, and length), so the device for assembling/disassembling that is compatible with each other and capable of measuring load values is required.

DOCUMENTS OF RELATED ART

Patent Document

Patent Document 1. Korean Patent Application No. 10-2013-0077598.

DISCLOSURE

Technical Problem

Accordingly, the present disclosure has been made keeping in mind the above problems occurring in the related art. It is intended to provide a device for assembling and disassembling a top nozzle of a nuclear fuel assembly, which allows a load value transmitted to the top nozzle to be measured and the convenience of an operation to be increased during assembling and disassembling the top nozzle for manufacturing a skeleton of a nuclear fuel assembly.

Technical Solution

In order to accomplish the above objectives, there may be provided a device for assembling and disassembling a top nozzle of a nuclear fuel assembly, the device including: a pedestal including a threaded hole through both sides; a screw bar screw-coupled to the threaded hole to reciprocate in a straight line; a top nozzle plate configured to be detachably coupled to the screw bar and to be able to be hooked by and coupled to the top nozzle of the nuclear fuel assembly; and a load cell provided between the top nozzle plate and the screw bar to measure a load value applied to the top nozzle plate hooked on the top nozzle.

At this time, the device may further include a housing provided between the load cell and the screw bar, wherein the load cell is detachably coupled to the housing.

At this time, the screw bar is coupled to the housing, and a bearing is interposed between the housing and the screw bar.

Advantageous Effects

The device for assembling and disassembling the top nozzle of the nuclear fuel assembly according to the present disclosure is configured to reciprocate in a straight line, enabling the top nozzle plate to push or pull the top nozzle, thereby resulting in the effect of increasing the convenience of assembling and disassembling the top nozzle.

In addition, the present disclosure includes a load cell, thereby having the effect of measuring a load value of the top nozzle plate, which is required during the operation of assembling and disassembling the top nozzle and occurs in the process of pushing or pulling the top nozzle. At this time, the present disclosure is configured to allow the load cell to be detachable, thereby resulting in the effect of increasing the convenience of load cell calibration operation.

In addition, the present disclosure is provided to allow the top nozzle plate to be detachably hooked and coupled to the top nozzle, thereby resulting in the effect of easily corresponding to the size of the top nozzle according to the type of nuclear fuel assembly.

BEST MODE

Terms or words used in the present specification and claims are not to be limitedly construed to their ordinary or dictionary meanings and need to be interpreted based on the meaning and concept consistent with the technical idea of the present disclosure based on the principle that the inventor may appropriately define the concept of the terms to explain his or her disclosure in the best way.

Hereinafter, a device for assembling and disassembling a top nozzle of a nuclear fuel assembly according to an exemplary embodiment of the present disclosure (hereinafter referred to as "device for assembling and disassembling a top nozzle") will be described with reference to accompanying FIGS. 2 to 5b.

The device for assembling and disassembling a top nozzle may be configured to assemble the top nozzle by pushing the top nozzle into the skeleton, disassemble the top nozzle by pulling the top nozzle from the skeleton, and measure a load value generated in the process that the top nozzle is pushed into or pulled out. In addition, the device for assembling and disassembling a top nozzle is configured to allow components to be detachable from one another, thereby facilitating the replacement and calibration operations of the components.

Figure 1:
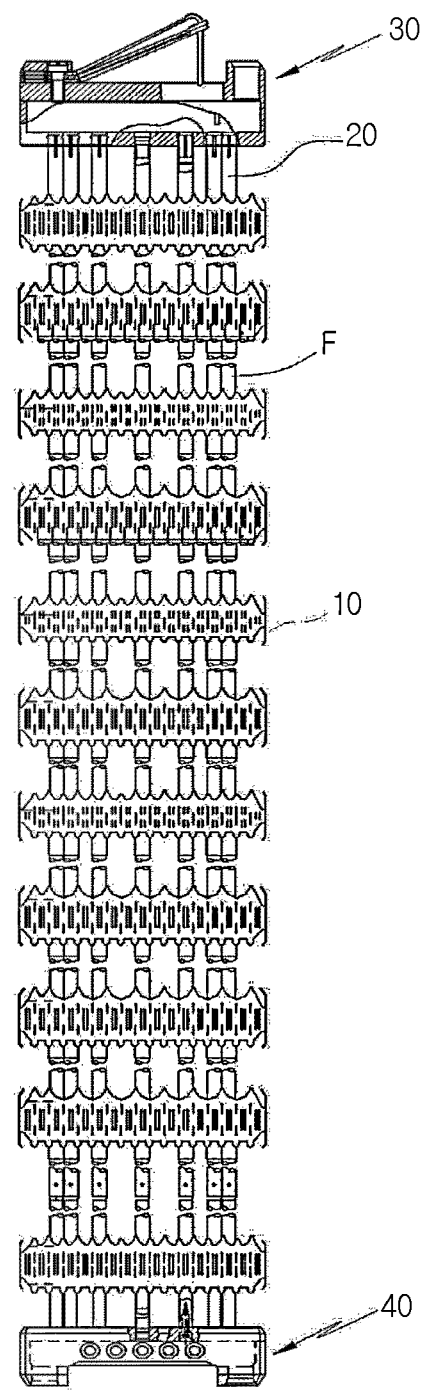
FIG. 1 is a diagram showing a WH-type nuclear fuel assembly.
Figure 2:
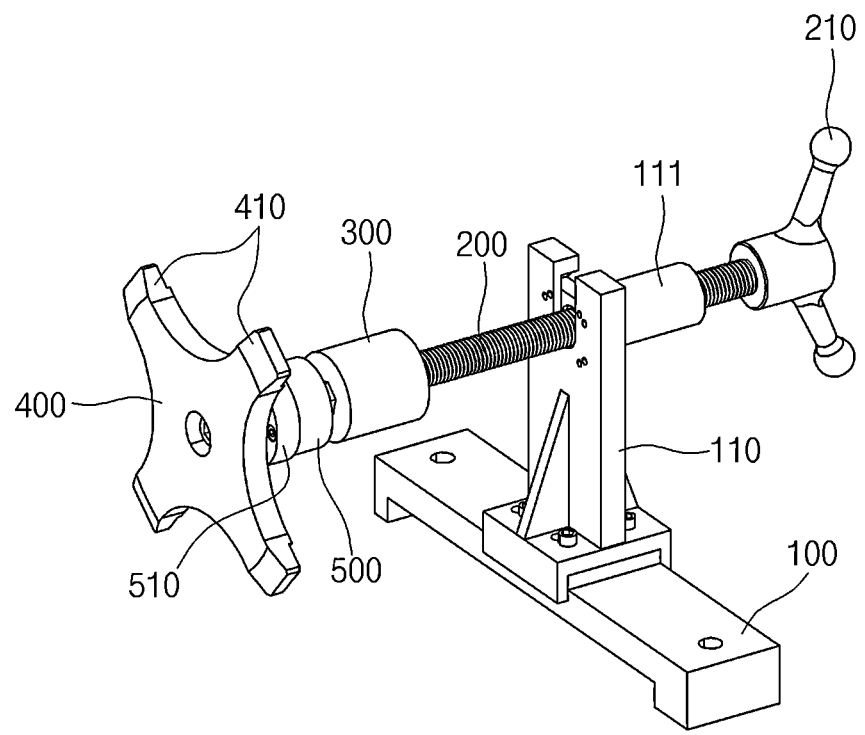
FIG. 2 is a perspective view showing a device for assembling and disassembling a top nozzle of the nuclear fuel assembly according to an exemplary embodiment of the present disclosure.
Figure 3:
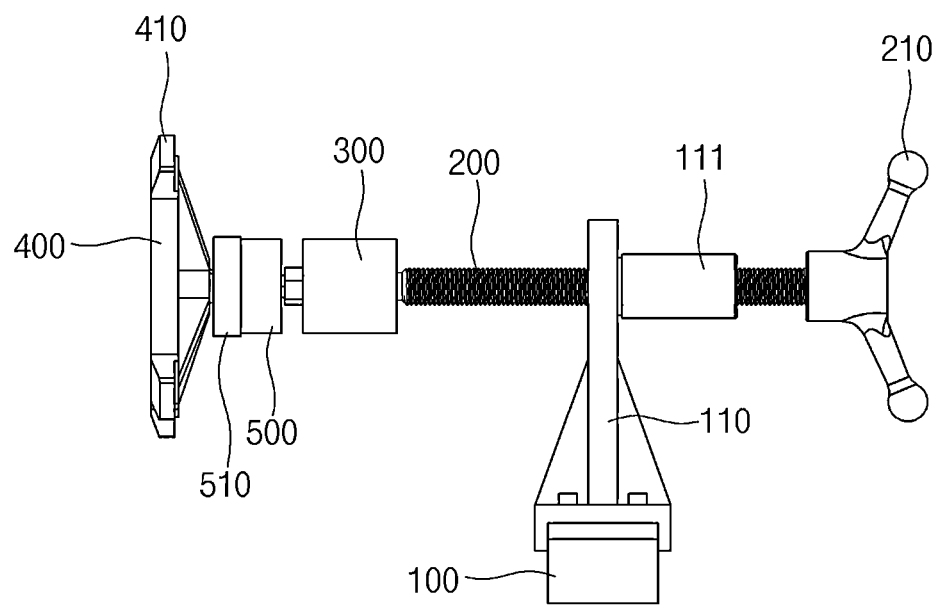
FIG. 3 is a side view showing the device for assembling and disassembling the top nozzle of the nuclear fuel assembly according to the exemplary embodiment of the present disclosure.

As shown in FIGS. 2 and 3, the device for assembling and disassembling a top nozzle includes a pedestal 100, a screw bar 200, a housing 300, a top nozzle plate 400, and a load cell 500.

The pedestal 100 serves to firmly support the device for assembling and disassembling a top nozzle and is provided to be allowed to be coupled to a bench (B: see FIG. 5a) for assembling and disassembling the top nozzle 30. The pedestal 100 includes a vertical portion 110 provided upward vertically, wherein the vertical portion 110 is provided with a threaded portion 111 having through both sides. The threaded portion 111 is configured to be screw-coupled with the screw bar 200 and provides a threaded hole 111a through both sides.

The screw bar 200 is provided to reciprocate in a straight line from the bench B toward the skeleton and to be screw-coupled to the threaded portion 111 of the pedestal 100. The screw bar 200 is provided in a shape of a bar with threads provided on an outer circumferential surface. That is, the screw bar 200 may reciprocate in a straight line through forward and reverse rotation in the screw portion 111. A handle 210 is provided at one end of the screw bar 200 to facilitate the operator's grip.

The housing 300 is coupled to an opposite end of the screw bar 200 and is an intermediary means for coupling the top nozzle plate 400 to the screw bar 200. In addition, the housing 300 and the screw bar 200 may be coupled to rotate freely with each other. In other words, the reciprocation in the straight line of the screw bar 200 is achieved through screw rotation of the screw bar 200. However, when the screw bar 200 rotates, the housing 300 is not interlocked with the rotation of the screw bar 200 but is configured to allow the screw bar 200 to rotate independently. Even while rotating inside the housing 300, the screw bar 200 rotates idle, ensuring that the rotation of the screw bar 200 does not impact the housing 300.

The top nozzle plate 400 is configured to be coupled to the top nozzle 30 by being hooked and is provided to be coupled to the screw bar 200. The top nozzle plate 400 may be configured to be an "X" shape having a plurality of vanes 410 and, through rotation, may be supported by the vanes 410 that are each hooked on inner steps 31 of the top nozzle 30.

Figure 4:
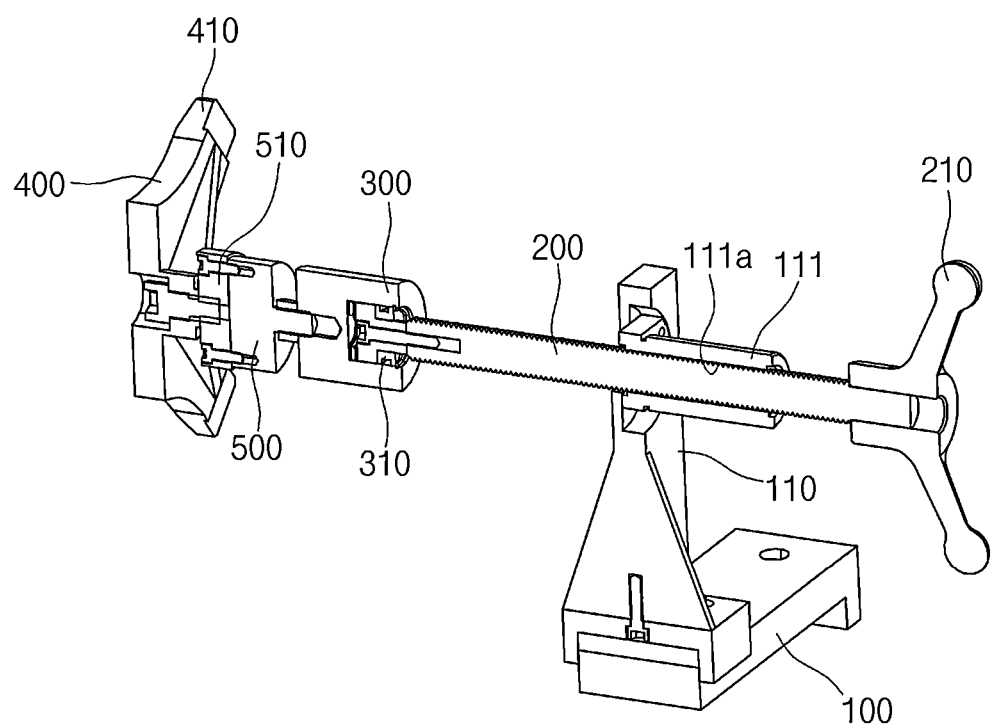
FIG. 4 is a perspective view showing the device for assembling and disassembling the top nozzle of the nuclear fuel assembly according to the exemplary embodiment of the present disclosure.

The load cell 500 serves to measure the load applied to the top nozzle plate 400 in the process that the top nozzle plate 400 pushes or pulls the top nozzle 30 by being coupled to the top nozzle 30. As shown in FIGS. 3 and 4, the load cell 500 is provided between the top nozzle plate 400 and the housing 300. As shown in FIG. 4, an end part of the load cell 500 may be screw coupled to the housing 300, and an opposite end part of the load cell 500 may be detachably coupled to the top nozzle plate 400 through an adapter 510. In this way, the load cell 500 is coupled between the housing 300 and the top nozzle plate 400 but is configured to be detachable, so that calibration operation of the load cell 500 may be easily performed. In other words, without the need to move the entire device for assembling and disassembling the top nozzle to calibrate the load cell 500, an operator may easily perform the calibration operation by separating only the load cell 500 from the housing 300 and the top nozzle plate 400.

Figure 5A:
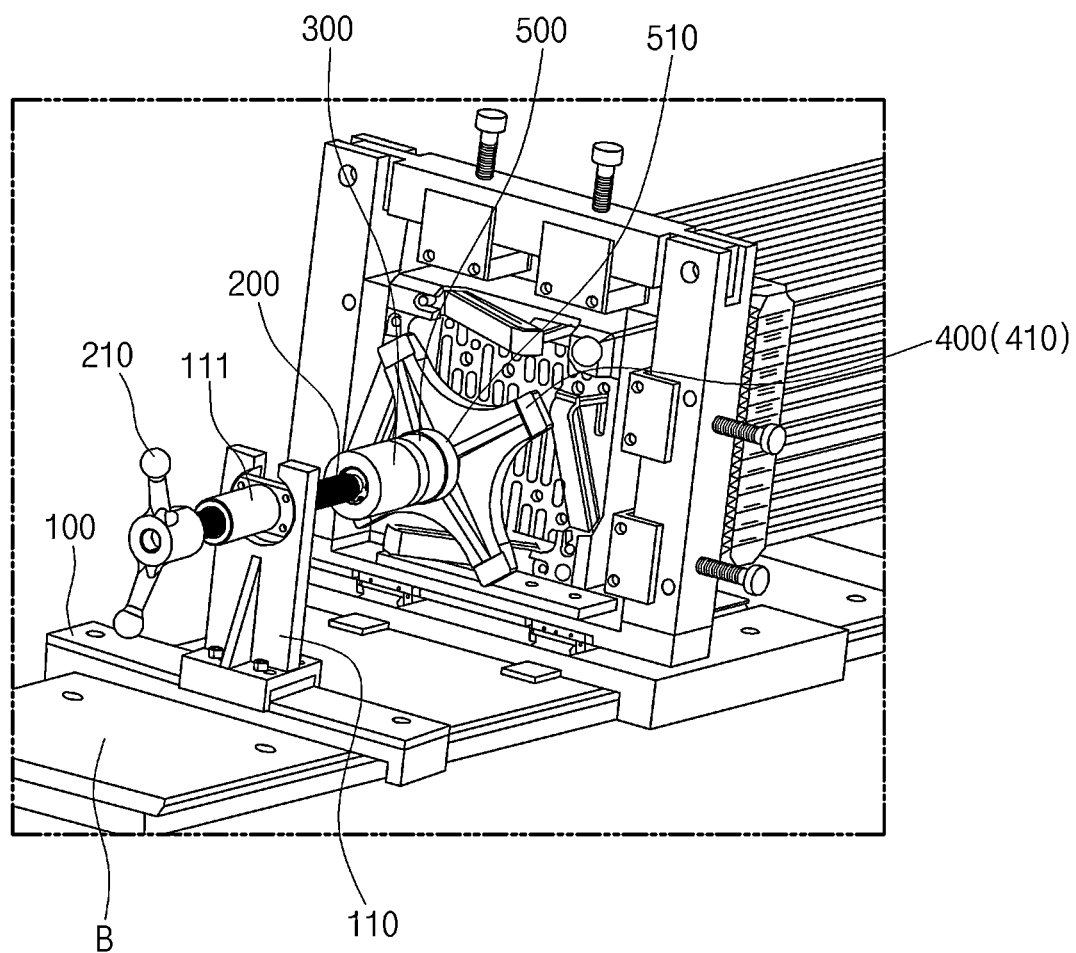
FIGS. 5a and 5b are diagrams showing before and after inserting the device for assembling and disassembling the top nozzle of the nuclear fuel assembly according to the exemplary embodiment of the present disclosure inside the top nozzle.
Figure 5B:
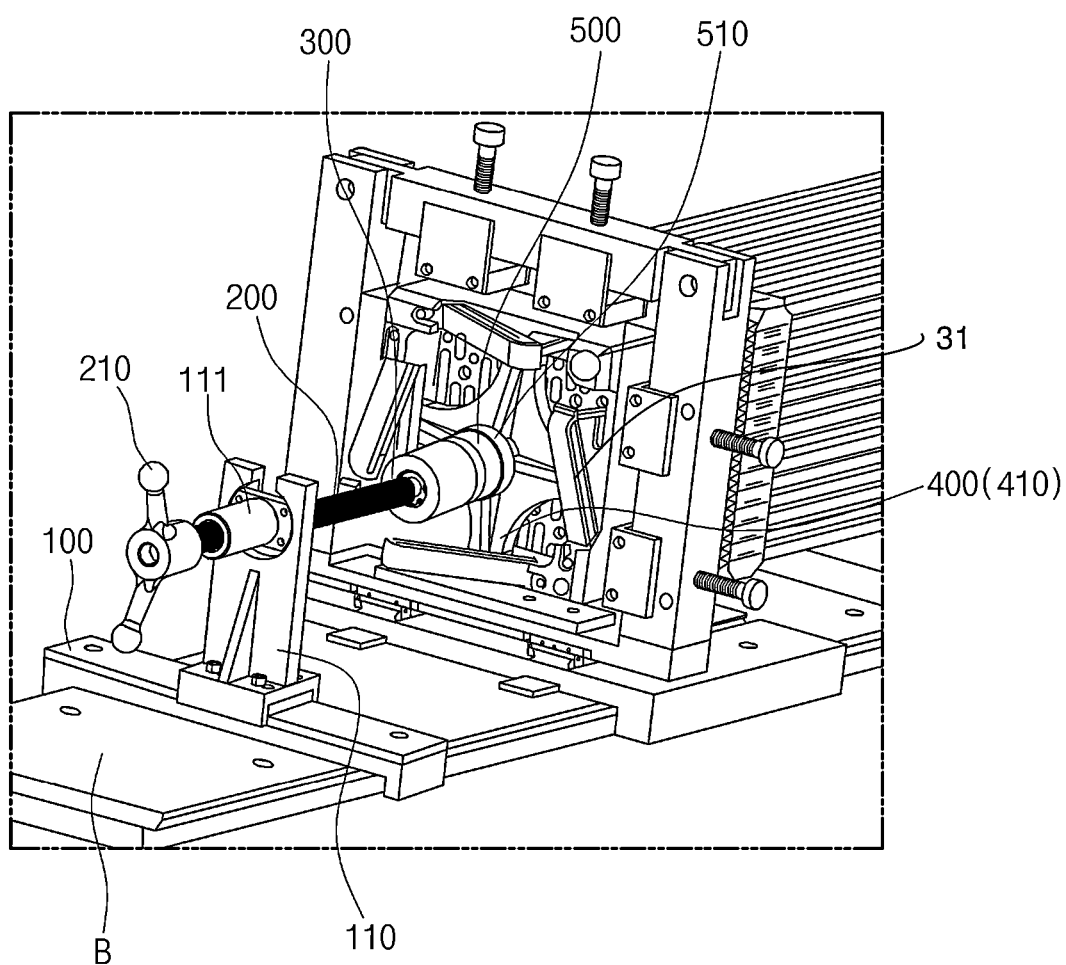

Hereinafter, with reference to accompanying FIGS. 5a and 5b, the operation of disassembling the top nozzle from the skeleton using the entire device for assembling and disassembling the top nozzle configured as described above will be described.

The operator secures the pedestal 100 on the bench B. At this time, the operator secures the pedestal 100 so that a reciprocating direction in the straight line of the screw bar 200 is toward the top nozzle 30. In such a state, the operator holds the handle 210 and rotates the screw bar 200. The screw bar 200 is rotated in the screw portion 111 and moves straight toward the top nozzle 30. At this time, the opposite end of the screw bar 200 rotates idle due to the bearing 310 inside the housing 300, so the rotation of the screw bar 200 is not interlocked with the top nozzle plate 400 and the housing 300 to which the load cell 500 is coupled. That is, the screw bar 200 moves forward in the straight line while being rotated by the operator, but the housing 300 does not rotate but only moves in the straight line. Meanwhile, before rotating the screw bar 200, the operator rotates the housing 300 to adjust the top nozzle plate 400 into an "X" shape as shown in FIG. 5a to adjust the angle of the top nozzle plate 400, thereby allowing the vanes 410 each to be directed toward corners of the top nozzle 30. That is, this is to prevent the vanes 410 of the top nozzle plate 400 from interfering with the edges of the top nozzle 30 when the screw bar 200 is moved.

Thereafter, the top nozzle plate 400 is allowed to be positioned inside the top nozzle 30 by movement of the screw bar 200. At this time, each vane 410 of the top nozzle plate 400 is positioned at each corner of the upper nozzle 30 as described above, and the operator initiates the top nozzle plate 400 to be changed from the "X" shape to a "†" shape by rotating the housing 300 arbitrarily. Each vane 410 of the top nozzle plate 400 moves to be positioned onto the inner steps 31 provided on the top nozzle 30 at an edge portion of the top nozzle 30, thereby causing interference with the top nozzle 30. Afterward, the operator rotates the screw bar 200 in a reverse direction. At this time, the top nozzle plate 400 moves to its original position, that is, in a direction opposite to the top nozzle 30, and pulls the top nozzle 30. As the force is continuously applied to pull the top nozzle plate 400, the top nozzle 30 is separated from the skeleton. At this time, by the load cell 500, the load value applied in the process that the top nozzle plate 400 pulls the top nozzle 30 is measured and displayed to the operator, and while observing the load value of the top nozzle plate 400 measured through the load cell 500, the operator operates disassembling the top nozzle 30. As a result, the disassembling operation of the top nozzle 30 using the device for assembling and disassembling a top nozzle is completed. Meanwhile, the size of the top nozzle is different depending on the type of nuclear fuel (16ACE7, 17ACE7) of the nuclear fuel assembly, so the operator may allow the top nozzle plate 400 to be separated from the adapter 510 and replaced.

As described so far, the device for assembling and disassembling a top nozzle of the nuclear fuel assembly according to the present disclosure may increase the convenience of assembling the top nozzle to the skeleton of the nuclear fuel assembly or separating the top nozzle from the skeleton and may measure the load value applied to the top nozzle, thereby allowing stable work to be performed without damaging parts.

Although the present disclosure has been described in detail with respect to the embodiments described above, it is evident to those skilled in the art that various changes and modifications are possible within the technical scope of the present disclosure, and such changes and modifications naturally fall within the scope of the appended patent claims.

<Description of the Reference Numerals in the Drawings>

| 100: pedestal | 110: vertical portion |
| 111: threaded portion | 111a: threaded hole |
| 200: screw bar | 210: handle |
| 300: housing | 310: bearing |
| 400: top nozzle plate | 410: vane |
| 500: pedestal | 510: adapter |

The invention claimed is:

1. A device for assembling and disassembling a top nozzle of a nuclear fuel assembly, the device comprising:
   a pedestal including a threaded hole formed through the pedestal;
   a screw bar configured to move forward and backward through the threaded hole to reciprocate in a straight line;
   a housing coupled with a first end of the screw bar;
   a bearing provided between the housing and the screw bar such that the housing is not interlocked with the screw bar;
   a top nozzle plate configured to be detachably coupled to the housing and to push or pull the top nozzle of the nuclear fuel assembly, wherein the nuclear fuel assembly contains a plurality of fuel rods thereinside; and
   a load cell provided between the top nozzle plate and the housing to measure a load value applied to the top nozzle plate when the top nozzle plate pushes and pulls the top nozzle of the nuclear fuel assembly.

2. The device of claim 1, wherein the load cell is detachably coupled to the housing.

3. The device of claim 1, further comprising a handle provided at a second end of the screw bar to operate the screw bar.

4. The device of claim 1, wherein the top nozzle plate has an "X" or "+" shape with a plurality of vanes.

5. The device of claim 4, wherein the vanes are configured to hook inner steps of the top nozzle of the nuclear fuel assembly.

\* \* \* \* \*